Nov. 17, 1925.

D. I. REITER

SNAP FASTENER

Filed Feb. 7, 1924

1,562,190

INVENTOR:
Daniel I. Reiter,
By Attorneys,
Fraser, Myers & Manley.

Patented Nov. 17, 1925.

1,562,190

UNITED STATES PATENT OFFICE.

DANIEL I. REITER, OF NEW YORK, N. Y., ASSIGNOR TO RAU FASTENER COMPANY, OF PROVIDENCE, RHODE ISLAND, A CORPORATION OF RHODE ISLAND.

SNAP FASTENER.

Application filed February 7, 1924. Serial No. 691,131.

*To all whom it may concern:*

Be it known that I, DANIEL I. REITER, a citizen of the United States of America, residing in the borough of Manhattan, city, county, and State of New York, have invented certain new and useful Improvements in Snap Fasteners, of which the following is a specification.

This invention relates to improvements in snap fasteners well adapted for use as a rug fastener although also applicable to snap fasteners of more general application.

One object of the invention is to provide a snap fastener of the type comprising a head and a flexible socket, the socket being constructed in a simple and inexpensive manner, avoiding the use of unnecessary parts whereby the cost of material and labor in assembling may be reduced to a minimum, without sacrificing the effectiveness of the finished article.

Referring to the accompanying drawings illustrating the preferred and other forms of the invention, and in which like parts are designated by the same reference characters in the different views.

Figure 1:
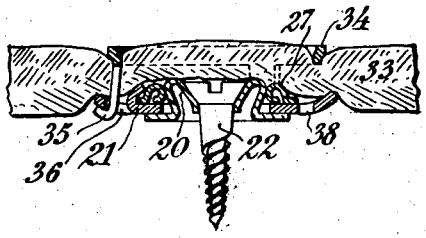
Fig. 1 is an enlarged view in cross-section of an assembled snap fastener embodying the invention in a form adapted for use as a rug fastener.
Figure 12:
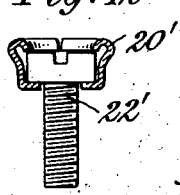
Fig. 12 is an enlarged cross-sectional view of a modified form of head adapted for use with the socket members shown in Figs. 3 to 6 inclusive.

Referring first to Figs. 1, 3, and 4, 20 designates a head and 21 designates a socket, the two parts co-operating to form a snap fastener in which the invention is embodied. The head 20 may be worked from any suitable material to a form adapted to be secured to the floor by means of an ordinary screw 22 (Fig. 1). This head and screw may be separable, or if preferred, the head and screw may be constructed as a single integral element, or as two elements held in mutually fixed relation so as to be equivalent to a single element. A head 20', of the last mentioned type, is illustrated in Fig. 12, in fixed relation with the screw 22'. The screw by which the head is secured to the floor, or other object, may be either of the usual wood-screw type, as indicated in Fig. 1, or of the machine-screw type, as indicated in Fig. 12, the latter form being adapted for engagement with a threaded floor plate not shown.

The socket (Figs. 3 and 4) comprises a resilient element 23 and a mounting member 24 therefor, which may be secured together in any appropriate manner as, for example, by lugs or fingers 25, which may be struck up from the material of the mounting member into engaging relation with the resilient element.

The resilient element 23, which alone, as well as in combination with the other elements of the snap fastener, constitutes an important element of the invention, comprises a ring of brass, or other appropriate material, having a relatively rigid outer portion 26 and a relatively flexible inner portion comprising, in the preferred form herein disclosed, a plurality of rolled tongues 27, extending inwardly from the outer portion 26.

The opening 28, in the mounting element 24, should be sufficiently larger in diameter than the diameter of the opening within the tongues 27 of the resilient element to permit the free passage of the head 20 through the mounting element into engagement with the resilient element. This head 20 should be of sufficient diameter to slightly flex the tongues 27 when forced through the resilient element of the socket, and should be of an undercut form, as indicated in Fig. 1, so as to be yieldingly held in engaging relation with the socket after it has been snapped through the opening between the fingers 27 to its assembled position.

Figure 4:
Fig. 4 is an enlarged view in cross-section of the socket, as shown in Fig. 3.
Figure 6:
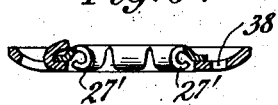
Figure 7:
Figs. 7, 8, 9, 10 and 11 illustrate the resilient element of the socket in various stages of manufacture, beginning with a blank and ending with the finished article.
Figure 8:
Figure 9:
Figure 10:
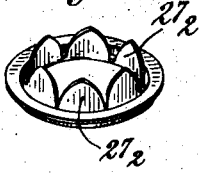
Figure 11:
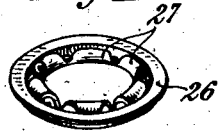

The fingers 27 may be bent to any appropriate form. As indicated in Fig. 4, the tongues are of such form that they do not project beyond the plane of that surface of the disk from which they are formed, which contacts with the surface of the mounting element. In this form, the ends of the tongues do not extend beyond the inner surface of the mounting element, the opening in which need be but a trifle larger than the opening within the tongues 27 of the resilient element. In Fig. 6 is disclosed a modified form of resilient element having tongues 27', the end portions of which extend beyond the inner surface of the mounting member, these portions of the tongues and the outer surface of the mounting member being in substantially the same plane. In this form of the invention, the opening in the mounting member must be of sufficient diameter to provide for the extended tongue portion and leave sufficient clear space to permit them to be flexed when the head of the snap fastener is pressed through the opening between the tongues.

The resilient element 23 may be constructed in any appropriate manner. One satisfactory method of producing a resilient ring of the character described is illustrated in Figs. 7 to 11 inclusive. Starting with a plane disk 29, Fig. 7, the same may be drawn or stamped into a dished form 30, Fig. 8, after which a star-shaped opening 31 may be stamped or cut from the dished portion, said opening comprising a series of radial slots 32, separating the remaining parts of the dished portion into an annular series of inwardly extending tongues $27_1$. These tongues may then be turned upwardly or into the dished part of the ring into the positions illustrated at $27_2$, Fig. 10. The tongues may then be rolled outwardly and into the dished portion of the ring to their final form, as indicated at 27, Fig. 11.

The resilient ring 23 and its mounting member 24, when assembled to produce the resilient socket 21, may be secured to the rug or other article 33, which is to be held in place by means of a clamping ring 34 (Fig. 1) having prongs 35 which may be passed through openings 36 in the mounting element, and clinched into engaging relation with its end surface. The openings in the mounting element, which are formed in striking up the lugs 25 by which the resilient element is secured in place, may be made use of as the openings 36 to receive the prongs 35.

Figure 2:
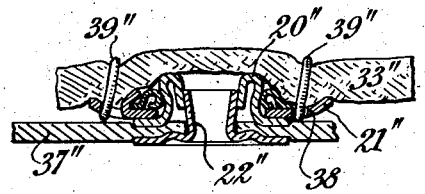
Fig. 2 is an enlarged cross-sectional view of a snap fastener embodying the invention in a form adapted to secure two pieces of leather, fabric, or other material.
Figure 3:
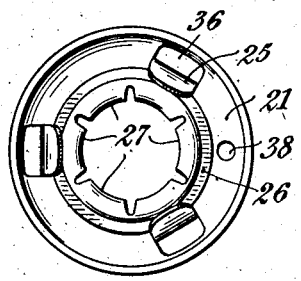
Fig. 3 is an enlarged plan view of the socket forming a part of the fastener disclosed in Fig. 1.
Figure 5:
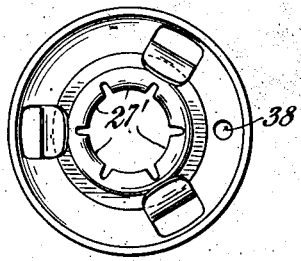
Figs. 5 and 6 are views corresponding respectively with Figs. 3 and 4, but illustrate a modified form of the socket.

The modification illustrated in Fig. 2 is a form of snap fastener adapted to secure two pieces of leather, fabric, or other material, in a manner appropriate for use as a garment fastener, or in the fastening of parts of carriage trimmings, and the like. This modification comprises a head 20, which may be secured to a sheet of leather or other material 37''', by means of a clamping element 22''. The socket 21'' may be secured to another sheet of leather, or other material 37'', in any appropriate manner. If desired, the mounting member may be provided with an opening 38 between two of the lugs 25 whereby the opening 38 and the three openings 36 form four openings in the mounting element by means of which it may be sewed to leather or other material 33, as indicated at 39'', Fig. 2.

It will be apparent that the resilient ring 23 and the mounting member 24 form a highly practical and efficient resilient socket of exceedingly simple construction, which may be produced at a minimum cost of material and workmanship.

Although the drawings, illustrating the invention, have been described as enlarged views of the snap fastener, meaning that they represent a fastener larger than that in common use, it will be understood that for very heavy service, fasteners as large or larger than that of the scale to which the drawings are made, would come within the scope of this invention.

The invention is not intended to be limited to the specific form in which it is herein shown and described by way of illustration, but is intended to include modifications and variations thereof within the scope of the appended claims.

What I claim is:

1. A resilient socket adapted to serve as one element of a separable fastener, said socket comprising a ring having a yielding inner portion and a relatively unyielding outer portion, an annular mounting member having an opening concentric with said ring and of a diameter greater than the internal diameter of said ring, and a plurality of tongues, engaging the relatively unyielding portion of said ring to hold said ring and mounting member in associated relation, said tongues being formed by striking up portions of the material of said mounting member near its outer periphery and thus providing a series of spaced openings to receive fastening elements of a socket attaching means.

2. A resilient ring adapted to serve as an element of a separable fastener, said ring comprising a dished disk of appropriate material open at the center and provided with a series of radial slots extending outwardly from its inner portion thereby separating the dished portion of said disk into an annular series of inwardly extending tongues, said tongues being rolled upwardly and outwardly into the dished portion of said disk, their ends being left free, thereby forming an annular series of independent spring elements having smoothly rounded stud engaging portions surrounding the opening in said ring, and lying relatively close to the plane of its outer portion.

3. A resilient ring adapted to serve as an element of a separable fastener, said ring comprising a dished disk of appropriate material open at the center and provided with a series of radial slots extending outwardly from its inner portion thereby separating the dished portion of said disk into an annular series of inwardly extending tongues, said tongues being rolled upwardly, outwardly and downwardly into the dished portion of said disk, their ends being left free, thereby forming an annular series of independent spring elements having smoothly rounded stud engaging portions surrounding the opening in said ring, and lying relatively close to the plane of its outer portion.

In witness whereof, I have hereunto signed my name.

DANIEL I. REITER.